United States Patent
Cerato (10) Patent No.: US 7,106,926 B2
(45) Date of Patent: Sep. 12, 2006

(54) OPTICAL SWITCHING DEVICE FOR WAVELENGTH DIVISION MULTIPLEX (WDM) TELECOMMUNICATIONS NETWORK

(75) Inventor: Ugo Cerato, Chiavari (IT)

(73) Assignee: Marconi Communications SpA, Genoa (IT)

( * ) Notice: Subject to any disclaimer, the term of this patent is extended or adjusted under 35 U.S.C. 154(b) by 0 days.

(21) Appl. No.: 10/488,339

(22) PCT Filed: Aug. 28, 2002

(86) PCT No.: PCT/IB02/03889

§ 371 (c)(1),
(2), (4) Date: Oct. 13, 2004

(87) PCT Pub. No.: WO03/019974

PCT Pub. Date: Mar. 6, 2003

(65) Prior Publication Data

US 2005/0117837 A1    Jun. 2, 2005

(30) Foreign Application Priority Data

Aug. 28, 2001    (IT)    .......................... MI2001A1817

(51) Int. Cl.
*G02B 6/35* (2006.01)
(52) U.S. Cl. .............................. 385/18; 385/17; 385/24
(58) Field of Classification Search ..................... None
See application file for complete search history.

(56) References Cited

U.S. PATENT DOCUMENTS 6,188,814 B1 *   2/2001   Bhalla .......................... 385/15
6,204,946 B1 *   3/2001   Aksyuk et al. ................. 398/9
6,212,309 B1     4/2001   Nguyen et al.
6,480,319 B1 *  11/2002   Daneman et al. ........... 359/290
6,640,023 B1 *  10/2003   Miller et al. ................... 385/17
6,694,073 B1 *   2/2004   Golub et al. ................... 385/18
6,731,833 B1 *   5/2004   Sandler et al. ................. 385/17
6,816,640 B1 *  11/2004   Tew .............................. 385/18

FOREIGN PATENT DOCUMENTS

WO    WO 01/055751 A3    8/2001

OTHER PUBLICATIONS

U.S. Appl. No. 60/236,532.*
U.S. Appl. No. 60/236,533.*
U.S. Appl. No. 60/236,677.*

* cited by examiner

*Primary Examiner*—Rodney Bovernick
*Assistant Examiner*—Mike Stahl
(74) *Attorney, Agent, or Firm*—Kirschstein, et al.

(57) ABSTRACT

An optical switching device for use in a wavelength division multiplex (WDM) telecommunication network for optically switching wavelength carriers from a plurality of input DWDM radiation to a selected output includes a plurality of optical input paths and a plurality of optical output paths; a first array of individually selectably tiltable MEMS mirrors in which each mirror is for receiving optical radiation from a respective input path; and a second array of individually selectably tiltable MEMS mirrors in which each mirror is for deflecting optical radiation incident thereon along a respective output path. The first and second arrays of mirrors are arranged on a common plane and are selectably tiltable about a single axis, and a fixed reflector is arranged above the two arrays of mirrors. In operation, optical radiation received along each input path is deflected by its respective mirror of the first array via the fixed reflector to a selected mirror of the second array for reflection therefrom to its respective output path.

6 Claims, 8 Drawing Sheets

OPTICAL SWITCHING DEVICE FOR WAVELENGTH DIVISION MULTIPLEX (WDM) TELECOMMUNICATIONS NETWORK

The present invention relates to an optical switching device for use in a WDM telecommunications network for selectively switching wavelength components (wavelength carriers) of WDM radiation to a selected output. More especially the invention concerns an optical switching device in which the switching is carried out optically using MEMS (Micro Electro Mechanical System) moveable reflectors or mirrors.

Optical cross-connects (OXCs) are known that are capable of switching WDM optical radiation arriving from a plurality of input fibres to selected output fibres. One known OXC comprises two arrays of MEMS moveable mirrors that face one another in which the first and second arrays are associated with the input fibres and output fibres respectively. Each array comprises a two-dimensional planar array of mirrors in which each mirror of the array is independently controllable and tiltable about two orthogonal axes. An input collimator arrangement is provided to direct WDM radiation from each of the input fibres onto a respective mirror of the first array and an output collimator arrangement provided to couple WDM radiation received from each of the mirrors of the second array into a respective output fibre. Each mirror of the first array can be tilted such as to selectively direct radiation onto any one of the mirrors of the second array and each mirror in the second plane is appropriately oriented such as to direct the radiation received thereat to the respective output collimator.

Such an optical switching arrangement is totally flexible in that it is capable of selectively connecting any one of the plurality of input fibres to any one of the plurality of output fibres making the arrangement ideally suited as a fibre switch. However, the need to be able to accurately tilt each mirror of the array individually about two axes makes control complex. Optically the design is also complex because of the need for precise alignment about three dimensions (3D). Furthermore the number of inputs that such an OXC is able to selectively connect is constrained by the maximum inclination angle of each of the mirrors and this places a limit on the size of the array. Many solutions have been proposed for precisely orienting the mirrors but these often involve the use of high voltage electrostatic driver members making OXC with a large number of inputs/outputs expensive and bulky.

For applications where it is required to switch individual wavelengths from a limited number of input fibres, total connectivity between every input and output is no longer required and it is possible to simplify the arrangement. The present invention has arisen in an endeavour to provide an optical switching arrangement that at least in part overcomes the above mentioned shortcomings of the known arrangements.

In accordance with the present invention there is provided an optical switching device comprising: a plurality of optical input paths and a plurality of optical output paths; a first array of individually selectably tiltable MEMS mirrors in which each mirror is for receiving optical radiation from a respective input path; and a second array of individually selectably tiltable MEMS mirrors in which each mirror is for deflecting optical radiation incident thereon along a respective output path, and is characterised in that the first and second arrays of mirrors are arranged on a common plane and are selectably tiltable about a single axis and a fixed reflector is arranged above the two arrays of mirrors, wherein in operation optical radiation received along each input path is deflected by its respective mirror of the first array via the fixed reflector to a selected mirror of the second array and there from to its respective output path.

Preferably the switching device is for switching wavelength carriers (components) from a plurality of input DWDM radiation inputs to a selected DWDM output and wherein the mirrors of the first and second arrays are arranged in rows and columns and in which each row is associated a DWDM input and each column associated with a respective wavelength carrier.

Advantageously the switching device further comprises means for separating each of the plurality of input DWDM radiation into its respective wavelength carriers and directing each carrier along a respective input path. Preferably such separation means includes a wavelength selective component such as a diffraction grating or AWG to spatially separate the DWDM radiation into its constituent wavelength components (carriers). Advantageously the separating means further includes collimating means for collimating and directing each wavelength carrier along a respective input path.

Preferably the switching device further comprises means for combining radiation from a plurality of output path to produce a DWDM output.

To enable wavelength carriers to be selectively added to or dropped from the switching device and to thereby enable regeneration and wavelength conversion of selected carriers, the switching device preferably further comprises additional arrays of individually selectably tiltable MEMS mirrors, said mirrors being tiltable about a single axis that is transverse to the axis of the mirrors of the first and second arrays and wherein said additional arrays are for respectively selectively adding radiation to an input path dropping radiation intended for an output path.

Preferably each of the array of mirrors are fabricated on a single silicon substrate.

In order that the present invention can be better understood embodiments of the invention will now be described, by way of example only, with reference to the accompanying drawings in which.

Figure 1:
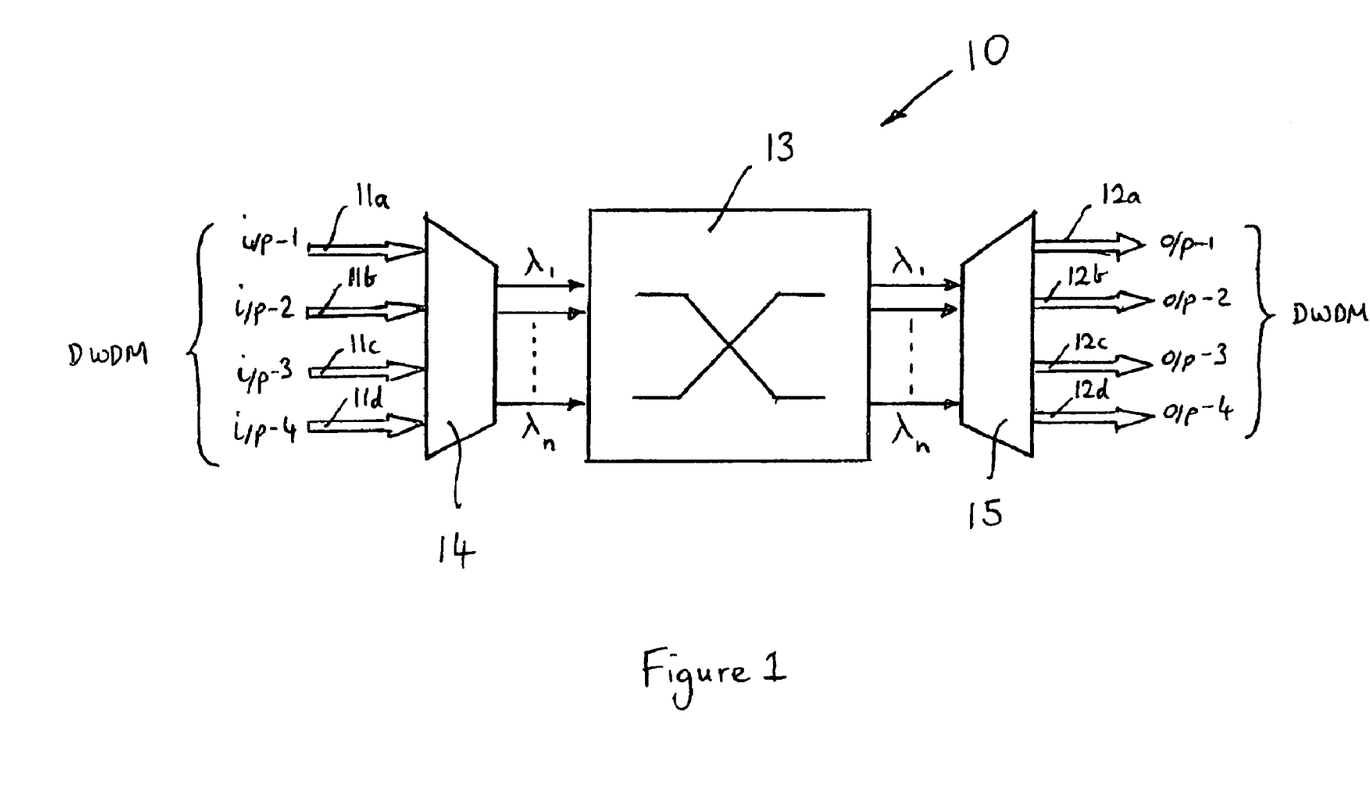
FIG. 1 is a schematic block representation of an optical switching arrangement in accordance with the present invention.

Referring to FIG. 1 there is shown a block schematic representation of an optical switching arrangement 10 in accordance with the present invention for use in a DWDM (Dense WDM) telecommunications network. The switching arrangement 10 has four optical inputs (i/p-1 to i/p-4) and four optical outputs (o/p-1 to o/p-4) for receiving and outputting thereat DWDM radiation 11a to 11d and 12a to 12d. In the example described the DWDM radiation comprises n wavelength carriers $\lambda_1$ to $\lambda_n$, for example sixteen wavelength carriers.

The optical switching arrangement 10 is operable to selectively switch the individual wavelength components $\lambda_1$ to $\lambda_n$ (wavelength carriers) of DWDM radiation applied to the four inputs i/p-1 to i/p-4 to a selected output i/p-1 to i/p-4. The arrangement comprises in order between the inputs and outputs: a wavelength separation unit (de-multiplexer) 14, an optical switching device 13 and a wavelength combiner unit (multiplexer) 15. The wavelength separation unit 14 is operable to separate each of the input DWDM radiation 11a to 11d into its constituent wavelength components (carriers/channels) that are then input along respective paths to the switching device 13.

For clarity, only paths for one input are illustrated and are denoted $\lambda_1$ to $\lambda_n$ in FIG. 1. The wavelength combiner unit 15 is operable to combine the radiation components output from the switching device 13 to produce DWDM radiation 12a to 12d that is output from the switching arrangement.

Figure 2:
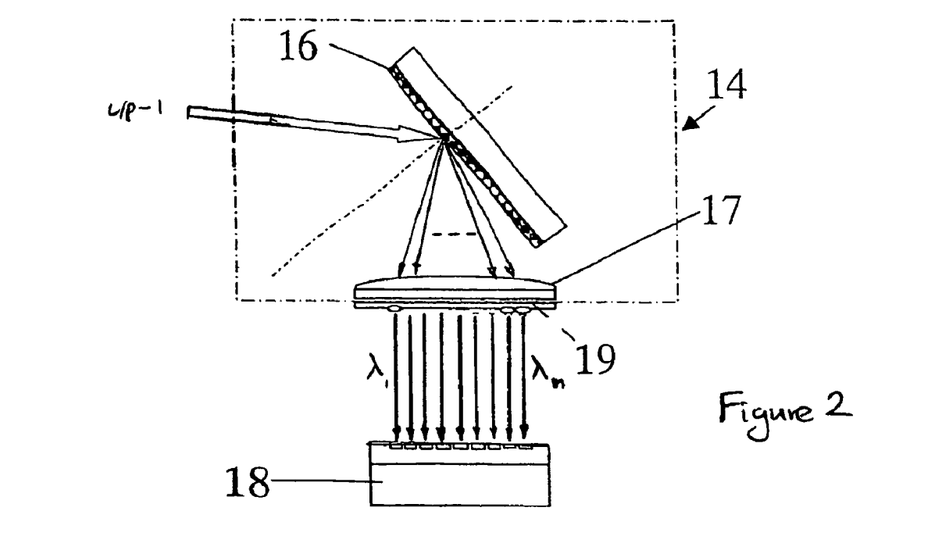
FIG. 2 is a schematic representation of a wavelength separation unit of the switching arrangement of FIG. 1.

The wavelength separation unit 14 is shown in greater detail in FIG. 2. To separate the DWDM input radiation into its constituent wavelength components, a known frequency (wavelength) selective device 16 (diffraction grating) is used. Each input DWDM radiation is directed, in the form of a collimated beam, onto the grating in order to separate the chromatic (wavelength) components. By means of lenses 17 the beams of radiation at the respective wavelengths are made parallel and collimated by collimators 19 and directed along the paths denoted $\lambda_1$ to $\lambda_n$ towards a respective mirror of a MEMS array 18 contained in the switching device 13. Each wavelength component of each DWDM input is thus focused on a respective mirror of the MEMS array 18. Again for the sake of clarity only paths for a single input i/p-1 are illustrated in FIG. 2.

As an alternative the frequency selective components 16 can be placed outside the switching arrangement; in this case fibres dedicated to single wavelength carrier will be supplied to feed the collimators.

The wavelength combiner unit (multiplexer) 15 connected to the output of the switching device is similar to the wavelength separation unit just described with input and output exchanged and is not further described as it is readily realised by those skilled in the art.

Figure 3:
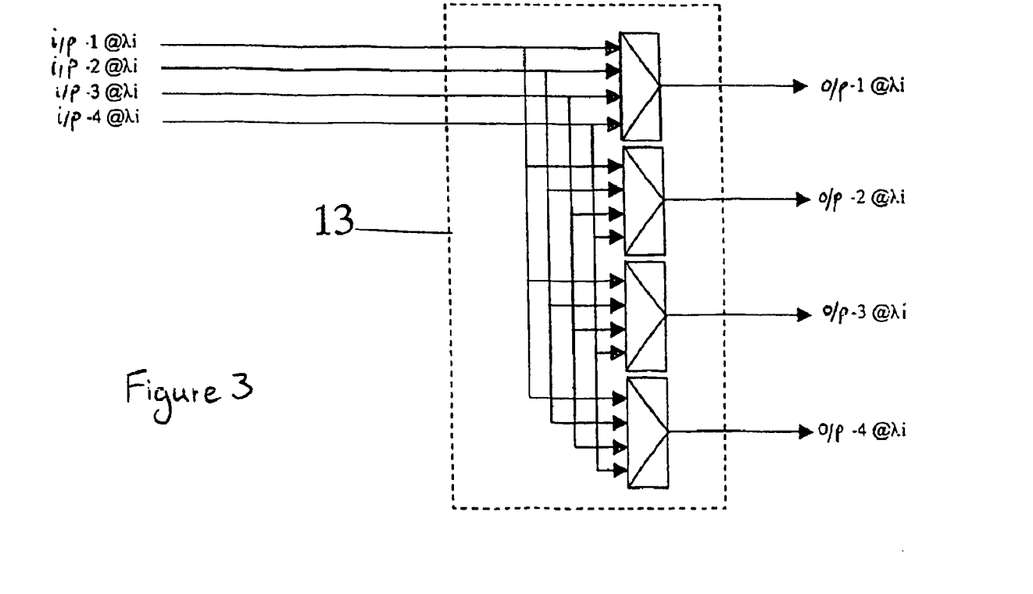
FIG. 3 is a further block diagram of the switching arrangement of the present invention.

FIG. 3 illustrates the functional topology of the optical switching device 13. As can be seen it is a device for re-routing a wavelength from an input set i/p-x@λi to an output set o/p-x@λi where x is the number of the DWDM input/output and i is the wavelength carrier. The same topology is repeated for each wavelength carrier in the WDM grid (for example 40 channels for ITU-T 100 GHZ). For ease of fabrication it is preferred that the switching device comprises a 4×4 switch (i.e. having four DWDM inputs and outputs). To realize switching arrangements having more than four inputs it is preferred to build these using a plurality of 4×4 switching device in separate switching planes. In each switching plane any wavelength component from any DWDM input can be switched to a corresponding channel (i.e. the same carrier wavelength) of the desired output. Practical considerations suggest expanding the DWDM network in layers and adding new switching planes with interconnectivity in the plane but not between different planes.

Figure 4:
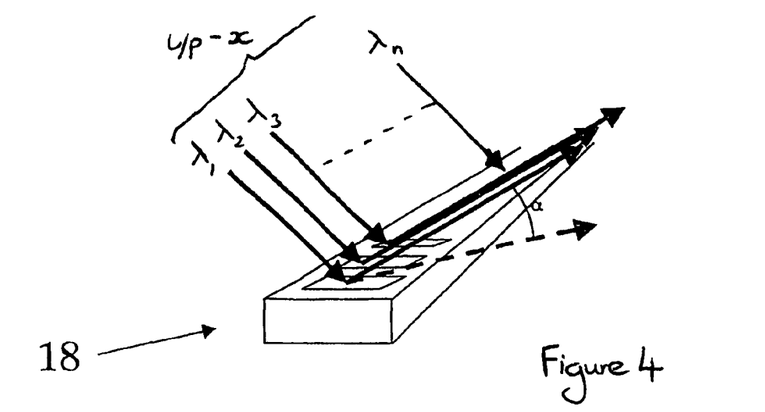
FIG. 4 is a diagrammatic perspective representation of an input array of MEM mirrors used in the optical switching arrangement of the present invention.

The basic 'building block' of the switching arrangement of the present invention is the optical switching device 13 that comprises two arrays of moveable mirrors that are rotatable (tiltable) about a single axis. An input array of mirrors 18 is provided for the input of the switching device 13 and an output array 23 for the output. Each mirror array comprises an m×n array of individually controllable mirrors in which m is the number of DWDM inputs (4 in the example being described) and n the number of wavelength channels within each DWDM input. FIG. 4 shows diagrammatically an input array 18 of mirrors with ray diagrams represented for a single input i/p-1 for each of the wavelength carriers $\lambda_1$ to $\lambda_n$. The mirror arrays are preferably fabricated as silicon MEMS having the mirrors (reflectors) etched on silicon surface by well-tested procedures. Each mirror can be individually deflected (tilted) by an associated driver (not shown).

Figure 5:
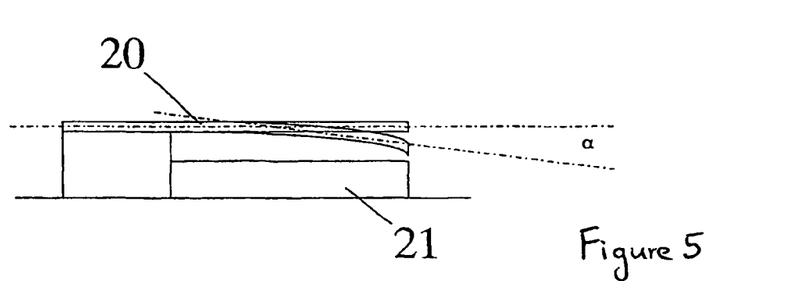
FIGS. 5 and 6 show diagrammatic side and plan views of a MEM mirror array.
Figure 6:
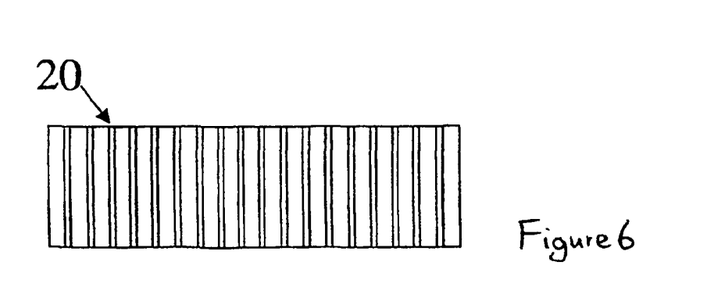

A mirror array is shown schematically in FIG. 5 (side view) and FIG. 6 (top view). These figures show a plurality of parallel flexible silicon strips 20 whose upper surface has been processed to make it reflecting. A respective driver 21 is provided below each strip for controlling deflection of the strip to a desired inclination a about a single axis.

Figure 7:
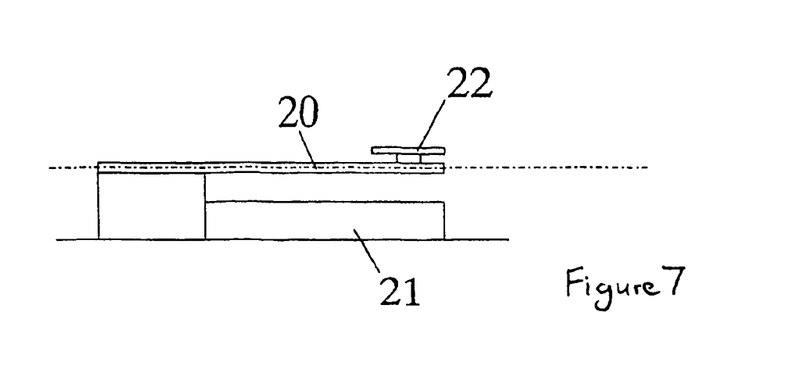
FIG. 7 shows a variant of the MEM mirror array of FIG. 5.

FIGS. 5 and 6 are descriptive only of the concept of the mirror array and a practical realization would be readily imaginable to those skilled in the art. To improve the planarity of the reflecting surface the mirrors can alternatively be secured to the flexible silicon strip instead of making the strip itself reflecting. This is shown diagrammatically in FIG. 7 in which a mirror 22 is mounted on the flexible strip 20.

As an alternative single axis, a cardan mount arrangement can be used.

Figure 8:
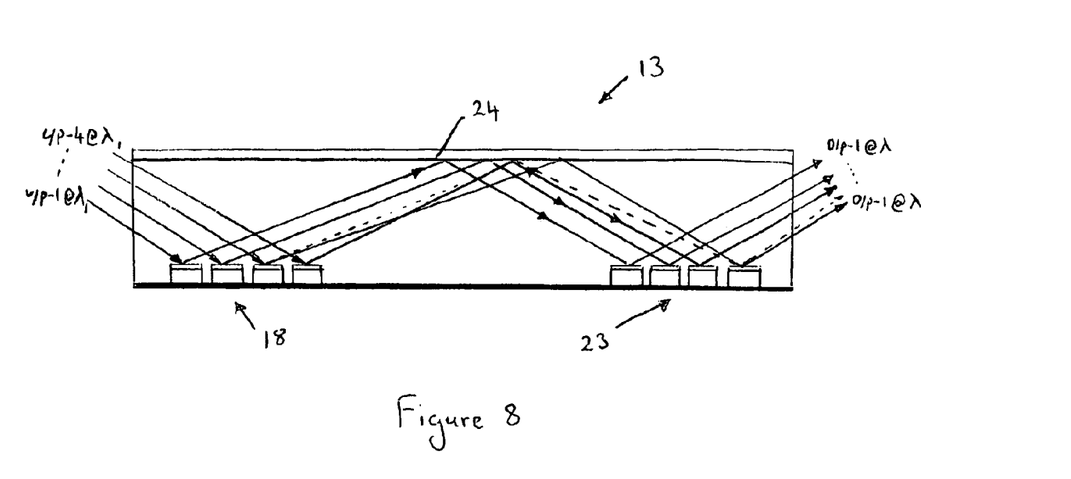
FIG. 8 is a diagrammatic side view of an optical switching device in accordance with the present invention.

FIG. 8 shows the structure of the switching device 13 for a four input (m=4) four output switching device showing the input 18 and output 23 mirror arrays. Ray lines for each of the four inputs are illustrated for a single wavelength carrier $\lambda_1$.

The MEMS mirror arrays 18 and 23 are arranged parallel on a common reference plane and a fixed reflecting plane (ceiling) 24 provided over the assembly. The fixed reflecting plane is preferably parallel with the plane on which the input and output mirror arrays are mounted.

The rays, denoted i/p-1@$\lambda_1$ to i/p-4@$\lambda_1$, arrive from the input collimator and the rays, denoted o/p-1@$\lambda_1$ to o/p-4@$\lambda_1$, are directed towards the output collimator. In FIG. 8 the rays indicate that i/p-1 and i/p-2 are connected to o/p-1 and o/p-2 whilst i/p-3 and i/p-4 are respectively cross-connected to o/p-4 and o/p-3. The dashed line indicates an alternative connected of i/p-3 to its corresponding output o/p-3. The interconnection between input and output is determined by the inclination of the mirrors within the input array 18.

Figure 9:
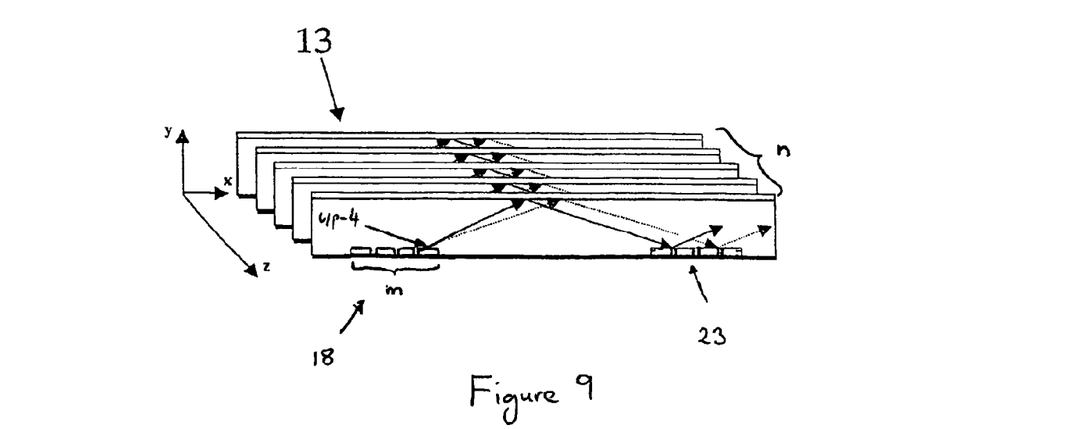
FIG. 9 is a diagrammatic perspective view of the device of FIG. 8.

In the cross section of FIG. 8 only mirrors are illustrated for a single wavelength carrier $\lambda_1$. The structure of the switching device will be understood as extending in direction z to allow simultaneous switching of all of the wavelength carriers $\lambda_1$ to $\lambda_n$. To clarify the concept of the switching device it can be thought of as comprising a plurality of strips as shown diagrammatically in FIG. 9. For clarity rays paths for i/p-4 are illustrated.

To allow simple wavelength regeneration and conversion a proportion of traffic handled by the switching arrangement should be accessible on the basis of a single wavelength channel. Such functionality allows additional cost saving because it avoids a need for a tuneable DWDM multiplexer and de-multiplexer in the regeneration device.

Figure 10:
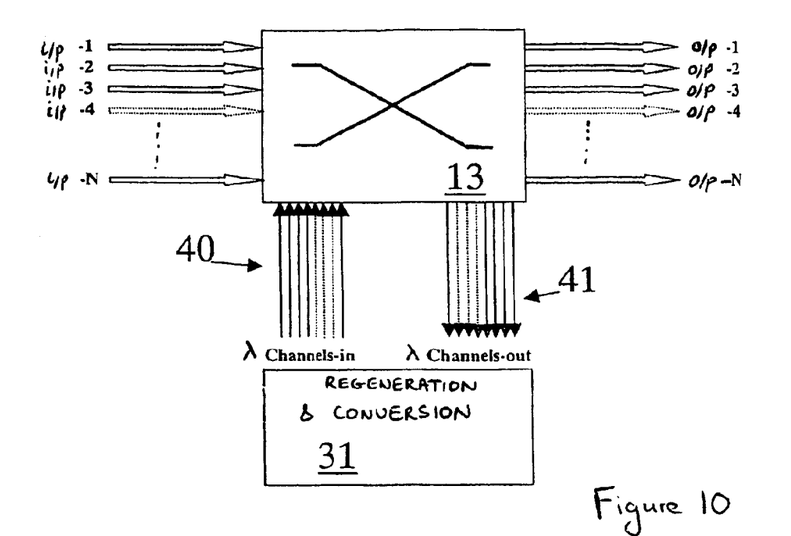
FIG. 10 is a block diagram of an optical switching arrangement that includes a regeneration and conversion unit.

At a block diagram level such a switching arrangement is shown in FIG. 10. As can be seen in this figure the switching device 13 further includes a number of ADD inputs ($\lambda$ Channels-in) 40 and DROP outputs ($\lambda$ Channels-out) 41 for connection to a conversion and regeneration block 31. The block 31 is operable for converting the wavelength and regenerating wavelength carriers. Conversion and regeneration devices are known to those skilled in the art and are not further described or shown.

Key to reducing complexity of the switching arrangement, is to allow only a defined percentage of regeneration over the total number of wavelength carriers but without restricting each regeneration channel to a predetermined wavelength carrier. More clearly, each ADD input or DROP output should be usable for any desired wavelength carrier.

Figure 11:
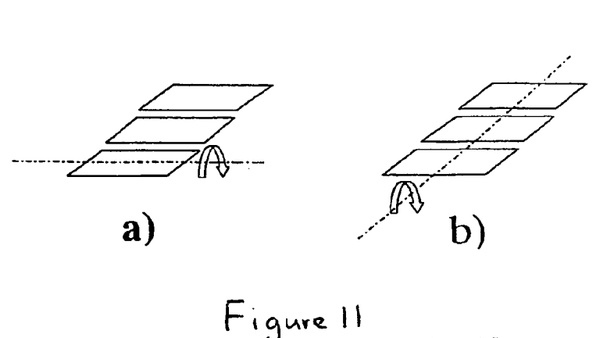
FIGS. 11a and 11b illustrate movement of mirrors in two mirror arrays used in an optical switching arrangement in accordance with the present invention.

To selectively drop and add wavelength carriers to and from the block 31, a further array of MEMS mirrors is provided within the switching device 13. These arrays of mirrors are similar to the array described above except that the angular movement of the mirrors is about a different axis, preferably about an axis that is orthogonal to that of the axis of the input and output MEMS. Referring to FIG. 11 there is shown, (a) a mirror array with a transverse axis of movement and, (b) a mirror array with a normal axis of movement.

Hereinafter in the accompanying Figures the 'transversal' arrays are identified by the letter T.

Figure 12:
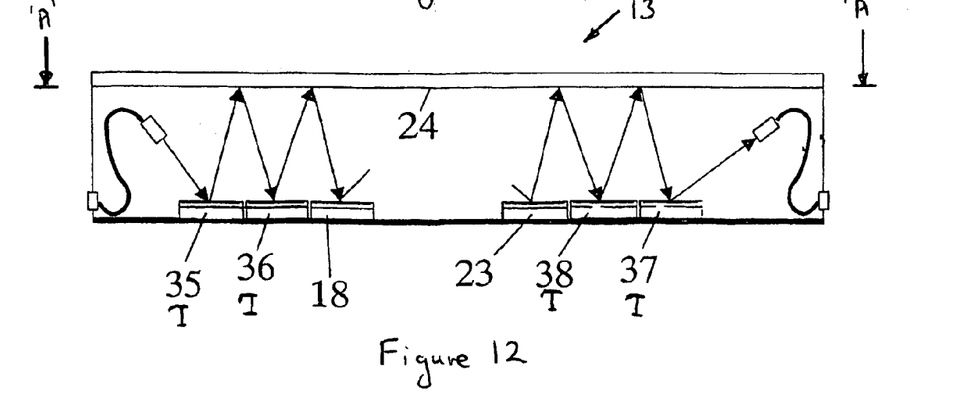
FIGS. 12 and 13 are diagrammatic side and plan views of the optical switching arrangement of FIG. 10.
Figure 13:
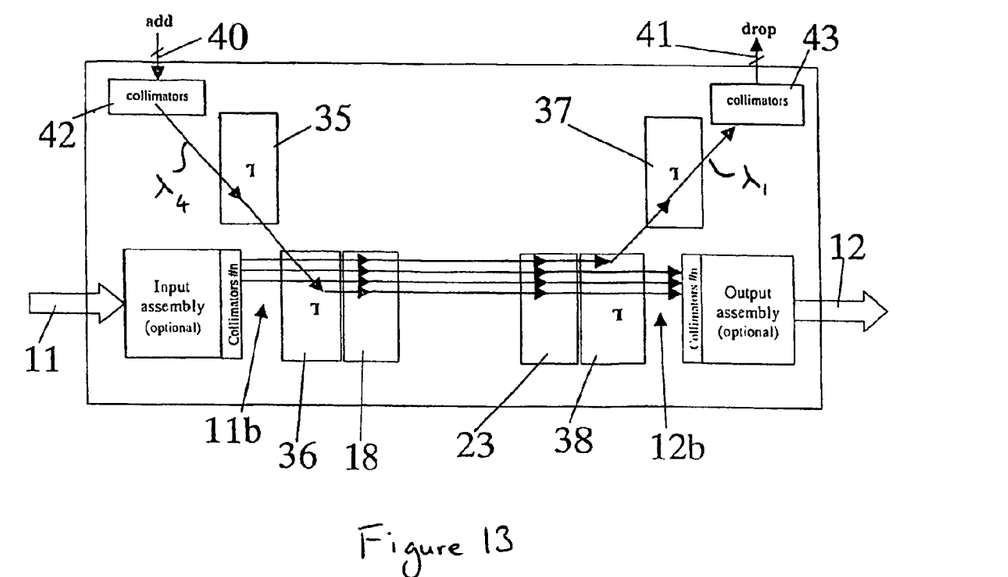

The switching device 13 including the ADD/DROP function for dropping and inserting wavelength carrier within the switching path is shown in FIGS. 12 (side view) and 13 (plan view). As may be seen in these figures, as compared to the embodiment described above with reference to FIG. 8, the switching device 13 further includes transversal pairs of mirror arrays 35 and 36, 37 and 38 located at the input and output of the switching device. The pair of transversal arrays 35 and 36 at the input of the switch are for receiving input radiation from an ADD input and selectively directing it to the input array 18. The pair of transversal arrays 37, 38 at the output of the switching device are for selectively directing radiation from the output array 23 to a DROP output 40.

The function performed by the transversal arrays 25, 36, 37 and 38 will be more clearly understood with reference to FIG. 13 which is a plan view along a direction "A" of FIG. 12. In this figure, the mirrors of the normal arrays 18, 23 have an axis of rotation that runs in a vertical direction as viewed in the figure whilst the transversal arrays 35, 36, 37, 38 have an axis of rotation running in a horizontal direction.

As can be seen, radiation at the ADD input is focused on the first transversal array 35 by a collimator 42. The array 35 reflects this radiation via the reflecting ceiling 24 of the device and there from to a selected mirrors of the transversal array 36 which redirects the radiation into a normal path between the arrays 18 and 23. When it is required to drop a wavelength carrier to the DROP output 41 the respective mirror of the array 23 is oriented such that the radiation is reflected by the ceiling 24 onto the respective mirror of the transversal array 38 which in turn directs it to the array 37 and there from coupled to the output 41 via a collimator 43. In a like manner each wavelength carrier can be added or dropped using arrays of mirrors that are moveable about a single axis. For the sake of simplicity FIGS. 12 and 13 are not to scale and illustrate a single wavelength carrier $\lambda_1$ being dropped to the output 41 and a single wavelength carrier $\lambda_4$ being added via the input 40.

In the embodiment shown only one channel per wavelength carrier can be dropped and reinserted and therefore regenerated or converted. By adding together pairs of transversal arrays several channels with the same wavelength can be handled at the same time.

In sizing the optical switching arrangement (optical cross connect), the intrinsic structure of C and L band commercial transmission systems suggests division of the wavelength carriers into sub-bands to allow greater scalability. The dimension of a basic switching arrangement can thus be considered to be 40 wavelength channels (carriers) in accordance with ITU-T 100 GHz grids. For a 25% regeneration or conversion capability, regeneration ports having ten inputs and outputs for each DWDM input is required. Thus for a basic 4×4 building block forty regeneration inputs 40 and outputs 41 are required.

Figure 14:
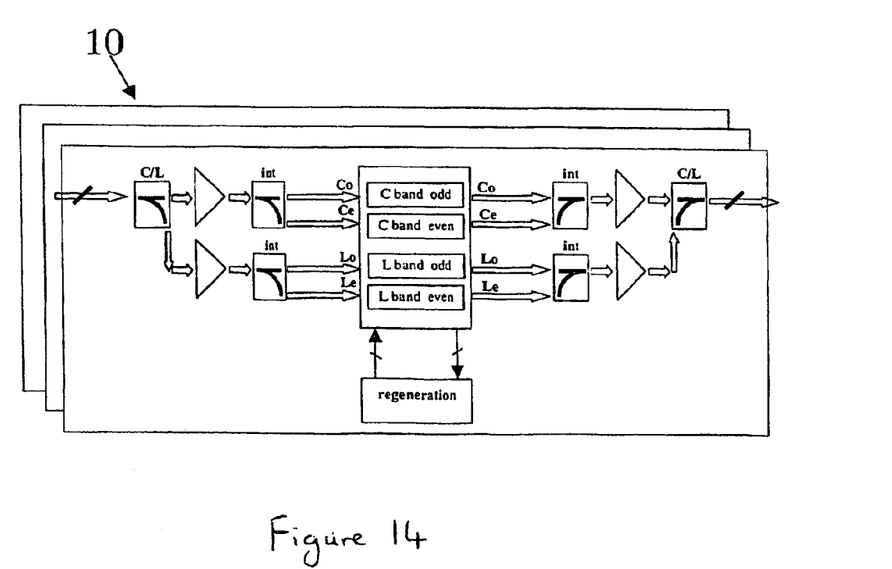
FIG. 14 shows the block diagram of an optical switching device in accordance with the present invention for use with C and L band DWDM radiation.

In accordance with the switching arrangement of the invention a single switching arrangement capable of switching 160 channels, that is 40 channels of the first 100 GHZ grid in band C. The arrangement can then be progressively updated to 640 wavelength channels. When the full switching capacity of the switching arrangement is no longer sufficient for routing all the crossing traffic, multiple layers can be provided. Routing between layers is preferably avoided, although limited interconnection between the layers is possible via the respective regenerator and converters of each layer. This is shown in a block diagram in FIG. 14 in which the constituent components of switching arrangement will be readily identifiable to those skilled in the art. Such a layered structure allows realizing, for example, the switching of 1280 wavelength channels (carriers).

For future upgrade of the switching arrangement, it is preferable that the optical switching device is free of wavelength selective components such as those required in the wavelength separation and combiner units 14 and 15. It is preferable therefore that all such wavelength selective filters or AWGs used to separate/combine the individual wavelength carriers from/to the DWDM radiation are positioned outside of the MEMS optical switching device 13 rather than being a part of this assembly. Multiple-fibre optical connectors can be used to connect the optical switching device to external optical circuitry. Input to and output from the switching device can be provided, for example, using individual fibres organized in multiple-fibre optical connectors for each DWDM input/output.

Figure 15:
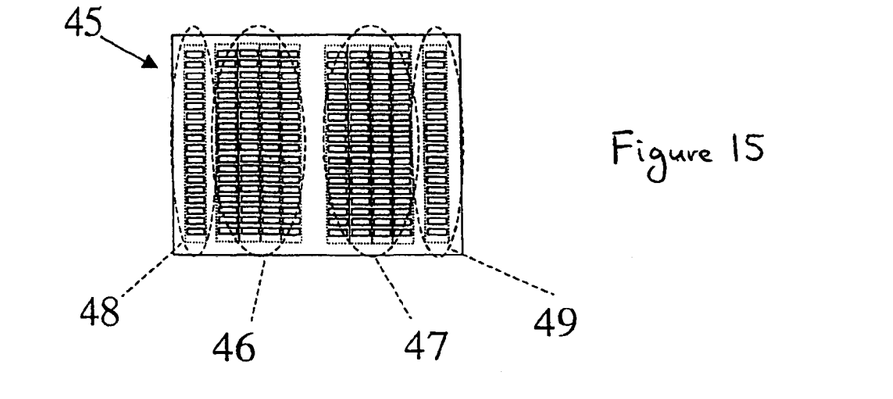
FIG. 15 is a view of a silicon substrate including mirror arrays in accordance with the optical switching device of the present invention.

To reduce assembly costs and achieve better reliability it is preferable to fabricate all of the mirror arrays of the switching device in the form of a single wafer MEMS structure. This is shown as an example in plan view in FIG. 15 in which MEMS arrays are fabricated on a single silicon substrate 45. The array of input array of mirrors is denoted 46 and the array of output mirrors is denoted 47. Two additional arrays 48, 49 (transversal arrays) are provided to respectively provide the ADD and DROP function. Only one channel for each wavelength can be added or extracted (25% total passing capability).

Figure 16:
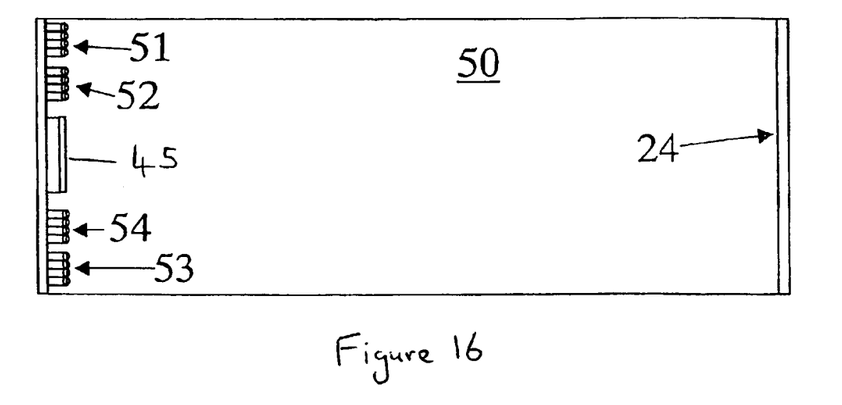
FIGS. 16 and 17 are diagrammatic side and front views of an embodiment of a switching device in accordance with the present invention.
Figure 17:
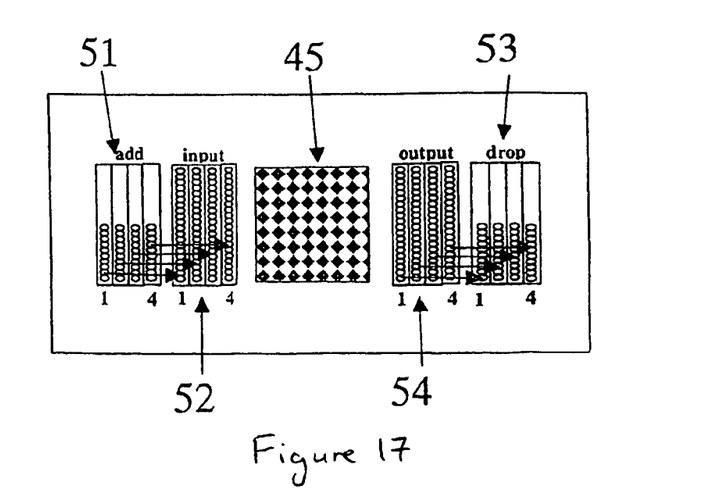

As shown diagrammatically in FIGS. 16 (side view) and 17 (plan view) the processed silicon substrate 45 is then be housed on an inner wall of a housing 50 with the reflecting surface 24 (ceiling) being defined by the facing inner wall of the housing. On the inner wall of the housing upon which the substrate 45 is mounted there are provided to one side of the substrate, a collimator array 51 for the ADD function and a collimator array 52 for the input. On the opposite side of the substrate 45 there are provided a collimator array 53 for the DROP function and a collimator array 54 for the output.

In this example embodiment it is assumed that the input/output connectors or fibres for the ADD and DROP function are assigned to specific DWDM bands.

As can be seen in FIG. 17 the channels to be added are connected through the first row of collimators of the collimator array 51 and are dedicated to the input channels incoming through the first row of the input collimator array 52. The channels dropped through the first row of collimators in the collimator array 54 arrive from the input channels through the first row of the output collimator array. The same correspondence applies to remaining rows of the arrays.

It should be noted that any wavelength of the $N^{th}$ input/output row can be intercepted by any ADD/DROP collimator of the Nth row.

Figure 18:
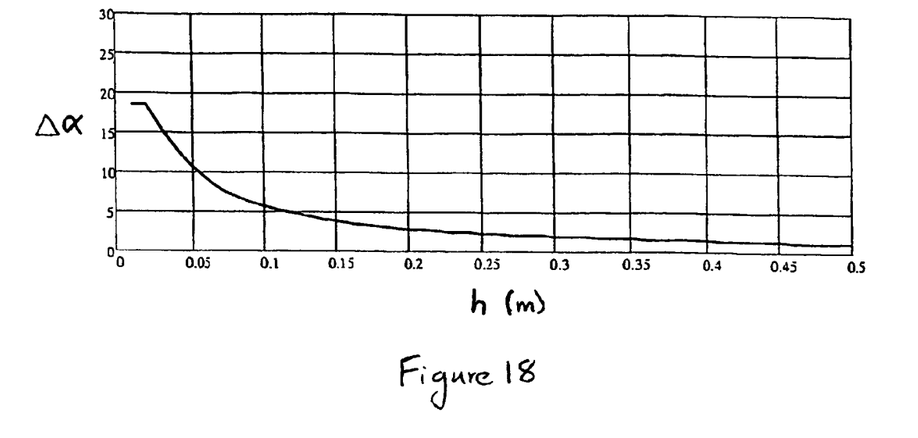
FIG. 18 is a graph of the increase of the oscillation angle of the mirrors.
Figure 19:
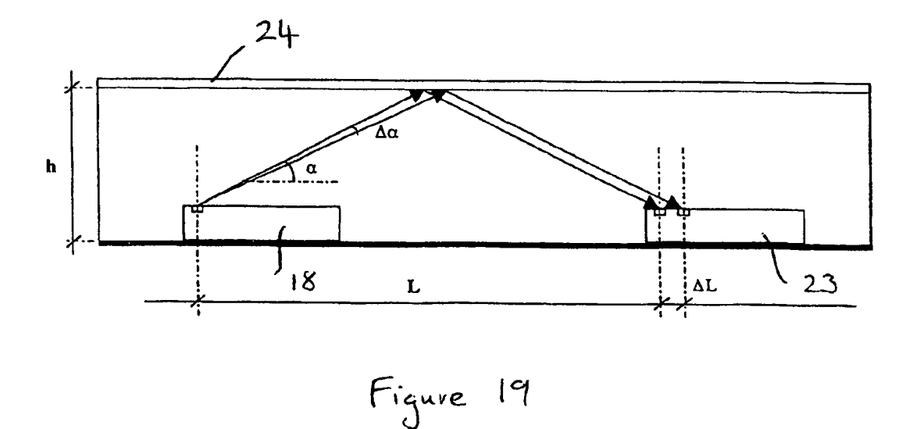
FIG. 19 shows a diagram of the magnitudes involved in the graph of FIG. 18.

To give an indication of the order of magnitude of the physical dimensions of the optical switching device, FIG. 18 shows a graph of the increase $\Delta\alpha$ of angle of inclination $\alpha$ of the mirrors as a function of height h of the reflecting ceiling above the plane on which the mirror arrays are mounted. FIG. 19 illustrates the geometry of the optical switching device and indicates the parameters involved in the calculation of the data in FIG. 18. The increase in angle of inclination $\Delta\alpha$ needed to direct radiation to an output mirror in a next row of the output array is given by the relationship:

$$\Delta\alpha = \arctan\left(\frac{2h\Delta L}{L(L+\Delta L)+4hh}\right)$$

in which L is the separation between a mirror of the input array and the corresponding mirror of the output array and $\Delta L$ is the spacing (pitch) of rows of mirrors in the input and output array.

The data plotted in FIG. 18 is for a pitch $\Delta L=20$ mm, $L=20$ mm and h varying from 0 to 500 mm. In the graph the change in angle $\Delta\alpha$ is expressed in degrees. It should be noted that with lengths L greater than 15 cm a change in angle of inclination of less than 5 degrees is required for a pitch of 20 mm shifts are required.

The invention claimed is:

1. An optical switching device, comprising:
    a) a plurality of optical input paths and a plurality of optical output paths;
    b) a first array of individually, selectably tiltable microelectromechanical system (MEMS) mirrors in which each mirror of the first array is operative for receiving optical radiation from a respective input path;
    c) a second array of individually, selectably tiltable MEMS mirrors in which each mirror of the second array is operative for deflecting the optical radiation incident thereon along a respective output path;
    d) the first and second arrays of mirrors being arranged on a common plane and being selectably tiltable about a single axis;
    e) a fixed reflector arranged above the two arrays of mirrors, wherein, in operation, the optical radiation received along each input path is deflected by its respective mirror of the first array via the fixed reflector to a selected mirror of the second array for reflection therefrom to its respective output path; and
    f) additional arrays of individually, selectably tiltable MEMS mirrors tiltable about a single axis that is transverse to the single axis of the mirrors of the first and second arrays, said additional arrays being operative for respectively selectively adding radiation to an input path or dropping radiation intended for an output path.

2. The switching device according to claim 1, in which the device is for switching wavelength carriers from a plurality of input dense wavelength division multiplex (DWDM) radiation to a selected DWDM output, and in which the mirrors of the first and second arrays are arranged in rows and columns, and in which each row is associated with a DWDM input, and in which each column is associated with a respective wavelength carrier.

3. The switching device according to claim 2, and further comprising mean for separating each of the plurality of input DWDM radiation into its respective wavelength carriers and directing each carrier along a respective input path.

4. The switching device according to claim 3, and further comprising means for combining radiation from the plurality of output paths to produce the DWDM output.

5. The switching device according to claim 4, in which at least one of the means for separating and the means for combining includes a wavelength selective member.

6. The switching device according to claim 1, in which each of the arrays of mirrors is fabricated on a single silicon substrate.

* * * * *